Sept. 23, 1952    P. D. BELLO    2,611,189
LEVEL
Filed Nov. 18, 1949
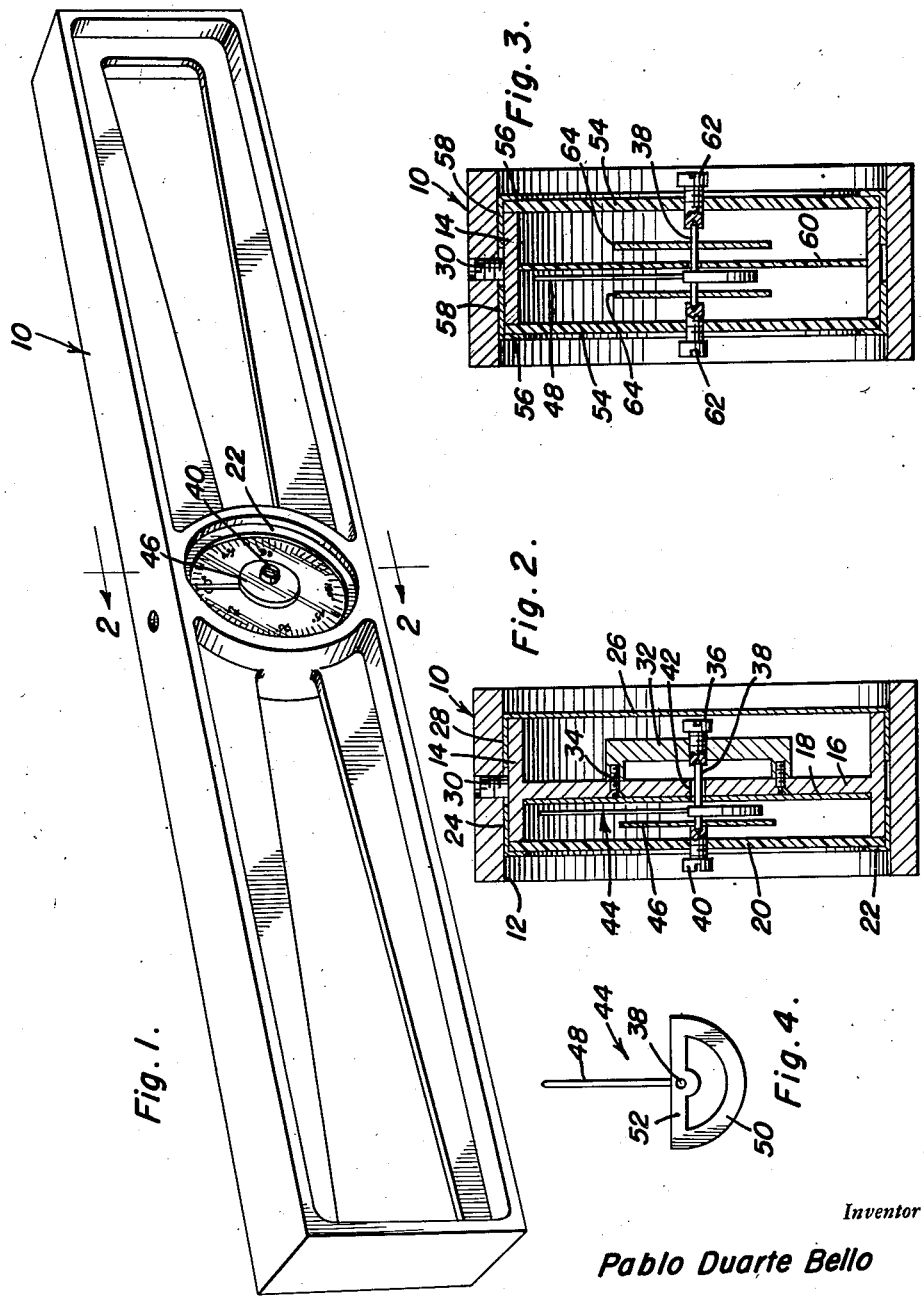
Inventor
Pablo Duarte Bello Patented Sept. 23, 1952

2,611,189

UNITED STATES PATENT OFFICE 2,611,189

LEVEL

Pablo Duarte Bello, Habana, Cuba

Application November 18, 1949, Serial No. 128,031

8 Claims. (Cl. 33—218)

1

The present invention relates to levels, such as that used by carpenters and masons, and more particularly to a level employing a gravity actuated pointer for slope determinations.

The primary object of this invention is to provide an instrument whereby the inclinations of surfaces relative to the horizontal plane may be determined.

Another important object of this invention is to provide a device of this character which is adjustable to compensate for errors introduced into the same by rough handling or the like, and which is also adjustable to zero the device relative to reference planes of various slopes.

Another important object of this invention is to provide an instrument which may be read from opposite sides, and in which the weighted portion of the pointer is concealed to avoid confusion and erroneous determinations.

A further object of this invention is to provide a level of this character in which the same is adjustable to compensate for wear on the moving parts, and in which the oscillation frequency is reduced commensurate with concealment of the weighted portion thereof.

A meritorious feature of the present invention resides in the means provided for adjustably positioning the indicator housing in the level frame, whereby the same may be zeroed to various reference planes and errors introduced by rough handling compensated for.

Another important feature of the present invention resides in the provision of means for adjusting the pointer shaft bearings without necessitating disassembly of the device.

Another important feature of the present invention resides in the provision of means for concealing the weighted portion of the pointer, whereby the likelihood of confusion and erroneous readings in reduced and a more pleasing appearance of the device achieved.

A final important feature to be specifically enumerated herein resides in the provision of a pointer having a low natural frequency about its axis of suspension, thereby facilitating reading the instrument, and yet which is of such a construction that the weighted portion of the same may be readily concealed.

These, together with various ancillary features and objects of the invention which will later become apparent as the following description proceeds, are attained by the present invention, preferred embodiments of which have been illustrated by way of example only in the accompanying drawings, wherein:

2

Figure 1 is a perspective view of a level embodying the subject matter of the present invention;

Figure 2 is a vertical transverse sectional view taken substantially upon the plane of the section line 2—2 of Figure 1;

Figure 3 is another vertical transverse sectional view similar to that shown in Figure 2, however showing a modification of the same; and Figure 4 is a side elevational view of the pointer.

Reference is now made more specifically to the accompanying drawings, wherein like numerals designate similar parts throughout the various views, and in which the numeral 10 indicates generally a level frame having a transverse opening 12 therethrough.

Attention is first directed to the embodiment of the invention shown in Figures 1 and 2, wherein the numeral 14 indicates a sleeve rotatably received in the opening 12, and having a transverse wall 16 therein. A dial 18 is secured to one face of the wall 16 and is provided with angular scale graduations thereon, as will be understood. A transparent disk 20 is seated against the end of the sleeve 14 adjacent the dial 18, and is retained in this position by a ring 22 having a peripheral, radially extending flange 24 receiving the adjacent end of the sleeve 14. A disk 26 is seated at the other end of the sleeve 14 and has a peripheral flange 28 similar to flange 24 receiving the other end of the sleeve 14. In the preferred construction the flanges 24 and 28 receive the sleeve 14 fairly snugly and are rotatable in the opening 12, however it will be understood that alternatively the flanges 24 and 28 could be rotatable on the sleeve 14 and fairly snugly fit into the opening 12. It will be understood that in either of the aforementioned constructions that the sleeve 14 together with the dial 18 will be rotatable in the opening 12.

A set screw 30 is provided in the frame 10 that adjustably engages the sleeve 14 for locking the same in any desired rotated position. It is by this arrangement that the graduations carried on the dial 18 may be adjusted angularly relative to the frame 10 for zeroing the same to any desired reference plane.

A cap 32 is secured to the wall 16 opposite the dial 18 by fasteners 34, and is centrally provided with an adjustable threaded plug 36 therethrough that has a conical recess at its inner end for receiving and rotatably supporting a conical pointed end of a pointer shaft 38. The disk 20, which is preferably of plastic material such as Lucite, is centrally provided with a plug 40 similar to the plug 36 and which receives the other end of the pointer shaft 38.

As shown clearly in Figure 2, the pointer shaft 38 extends through an aperture 42 provided in the wall 16 and dial 18, and has secured thereon a pointer indicated generally by the numeral 44 and an opaque disk 46. The pointer 44 being disposed adjacent the dial 18, with the disk 46 being disposed between the disk 20 and the pointer 44.

The pointer 44, see Figure 4, comprises a needle 48 and a weighted portion formed of an arcuate or semi-circular member 50 having its ends connected to the shaft 38 and needle 48 by arms 52. The radius of the weighted portion of the pointer 44 is less than that of the disk 46, whereby the weighted portion is concealed from view by the disk 46, while the needle 48 is of sufficient length as to be readily seen against the background of the dial 18 through the transparent disk 20. It is important to note that while the weighted portion of the pointer 44 is of such a size as to be concealed behind the disk 46, the proportions of the same are such as to provide a relatively longer radius of gyration compared to the displacement of its center of gravity from the shaft 38, whereby a lower natural frequency of the pointer 44 is attained facilitating reading of the instrument.

It is within the contemplated scope of this invention that the dial 18 be formed of translucent material and have a mirrored surface adjacent the wall 16, whereby errors in reading the instrument due to parallax may be eliminated by the operator aligning his eye with the needle 44 and the image of the same reflected from the dial 18.

Reference is now made to the embodiment of the invention illustrated in Figure 3, wherein it will be noted that the arrangement of the sleeve 14 and the frame 10 is the same as that shown in the previous embodiment. In this embodiment transparent disks 54 are retained at opposite ends of the sleeve 14 by rings 56 having flanges 58, the arrangement being analogous to that of the disk 20 and the ring 22 of Figure 2. A transverse, transparent dial 60 is disposed in the sleeve 14, and the pointer shaft 38 extends therethrough having its ends journalled in adjustable bearing plugs 62 received in the transparent disks 54.

The pointer shaft 38 is provided with a pointer 44 and has opaque disks 64 disposed on opposite sides of the pointer 44 for concealing the weighted portion thereof. As will be readily seen the needle 48 may be readily viewed through either of the disks 54 and the dial 60 is provided with suitable angular scale graduations thereon which may be read through either of the disks 54.

While in the embodiment illustrated in Figure 3, it is only necessary to provide the dial 60 with a single set of scale graduations, it is preferred that since the dial 60 is transparent that two concentric circles of the numerical values of the graduations be provided, one of which is readable from one side of the instrument while the other is readable from the other side of the instrument.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A level comprising a frame having a circular transverse opening therein, a sleeve rotatably received in said opening, a transverse disk in said sleeve having scale graduations thereon, a ring received in said opening and having a peripheral, axially extending flange receiving one end of said sleeve therein, a transparent disk seated between the ring and said end of the sleeve, said frame having an internally threaded bore opening into the opening, a set screw threaded in said bore radially disposed with respect to the axis of the sleeve and engaging and retaining said sleeve in a selected rotated position, a pointer in said sleeve having a shaft rotatably supported by said transparent disk, said pointer including a weighted portion.

2. A level comprising a frame having a circular transverse opening therein, a sleeve rotatably received in said opening, a transverse disk in said sleeve having scale graduations thereon, a ring received in said opening and having a peripheral, axially extending flange receiving one end of said sleeve, a transparent disk seated between the ring and said end of the sleeve, a set screw in said frame radially disposed with respect to the sleeve and engaging and retaining said sleeve in a selected rotated position by forcing the sleeve into frictional engagement with the flange and the latter into frictional engagement with the frame, a pointer in said sleeve having a shaft rotatably supported by said transparent disk, said pointer including a weighted portion.

3. The combination of claim 2, wherein said shaft is rotatably supported by said transparent disk by means of said shaft having a conical end, a plug adjustably extending through said transparent disk and having a conical recess receiving said conical end, and an opaque disk carried by said shaft concealing said weighted portion from view through said transparent disk.

4. A level comprising a frame having a circular transverse opening therein, a sleeve rotatably received in said sleeve, a set screw in said frame engaging and retaining said sleeve in an adjusted rotated position, a transverse wall in said sleeve having scale graduations thereon, a ring having a peripheral, axially extending flange receiving one end of said sleeve, a transparent disk seated between the ring and said end of the sleeve, a plug adjustably extending through said disk and having a conical recess at one end thereof, a pointer shaft having conical ends, means carried by said wall for rotatably supporting one end of said shaft with the other end of said shaft being rotatably supported by said plug, a pointer carried by said shaft having a weighted portion, an opaque disk carried by said shaft concealing said weighted portion from view through said transparent disk, and a circular end wall having a peripheral flange receiving the other end of said sleeve.

5. The combination of claim 4, wherein said weighted portion comprises an arcuate member and a pair of arms secured to said shaft and radiating from said shaft and connected to the ends of said member.

6. A level comprising a frame having a circular transverse opening therethrough, a pair of circular members having peripheral axial flanges, a sleeve disposed between the circular members and having its opposite ends received within said flanges, with said flanges being spaced apart, said sleeve and circular members being rotatably received within said transverse opening, a set screw in said frame releasably engaging said sleeve between the flanges and holding the sleeve in firm frictional engagement with the flanges and the latter in firm frictional engagement with the walls of the frame defining said transverse opening, a transparent disk retained between one end of the sleeve and one of the circular members, said one circular member having an opening therethrough, a shaft rotatably mounted between the circular members, a weighted pointer fixed to said shaft, and a disk fixed within the sleeve having indicia thereon.

7. The combination of claim 6, wherein said disk is transparent and has a mirrored surface on the side thereof opposite the pointer.

8. A level comprising a frame having a circular transverse opening therethrough, a disk and a ring each having a peripheral axial flange, a sleeve disposed between the disk and the ring and having its opposite ends received in said flanges with the latter being spaced apart, said sleeve being rotatably received in said opening, a set screw in the frame adjustably bearing upon the sleeve and urging the sleeve into frictional engagement with the flanges and the latter into frictional engagement with the side walls of the frame defining said transverse opening, a transverse wall in said sleeve intermediate the ends thereof, a bearing supporting plate secured in spaced relation to one side of the wall, a transparent disk engaged between one end of the sleeve and said ring, said wall having a central aperture therethrough, a shaft rotatably extending through the aperture, bearing means carried by the plate and said transparent disk rotatably supporting the opposite ends of the shaft, a weighted pointer fixed to the shaft on the side of the wall remote from the plate, and a dial carried by the wall adjacent said pointer.

PABLO DUARTE BELLO.

REFERENCES CITED

The following references are of record in the file of this patent:

UNITED STATES PATENTS

| Number | Name | Date |
|---|---|---|
| 691,146 | Janin | Jan. 14, 1902 |
| 765,847 | Kreatz | July 26, 1904 |
| 792,160 | Parrish | June 13, 1905 |
| 857,991 | Gibson | June 25, 1907 |
| 871,924 | Gardner | Nov. 26, 1907 |
| 988,705 | Graham | Apr. 4, 1911 |
| 1,015,608 | Almgren | Jan. 23, 1912 |
| 1,338,639 | Lillberg | Apr. 27, 1920 |
| 1,590,136 | Valentine | June 22, 1926 |
| 1,879,587 | Swain | Sept. 27, 1932 |
| 2,215,310 | Zupanec | Sept. 17, 1940 |
| 2,220,029 | Stephan | Oct. 29, 1940 |
| 2,298,072 | Somerville | Oct. 6, 1942 |